Sept. 27, 1932.    C. C. DAVIS    1,879,122
CLAMP FOR USE IN WELDING
Filed May 29, 1931    2 Sheets-Sheet 1
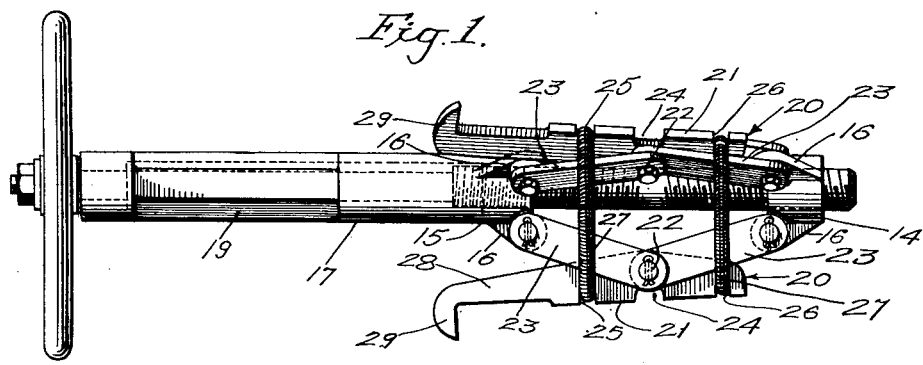
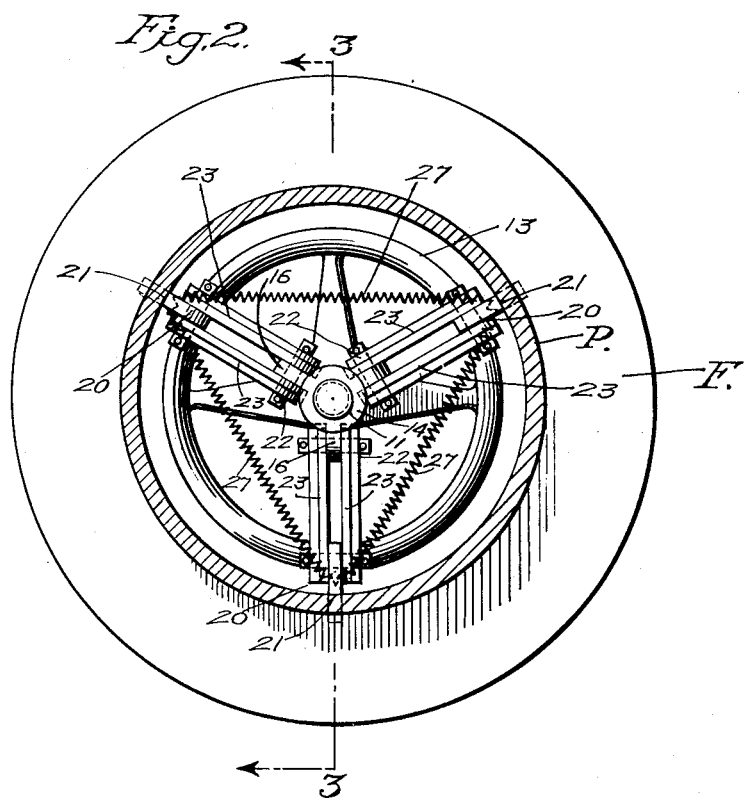
Inventor:—
Charles C. Davis
by his Attorneys
Howson & Howson Patented Sept. 27, 1932

1,879,122

UNITED STATES PATENT OFFICE

CHARLES C. DAVIS, OF PHILADELPHIA, PENNSYLVANIA

CLAMP FOR USE IN WELDING

Application filed May 29, 1931. Serial No. 541,102.

This invention relates to welding apparatus, and more particularly to a clamp for use in holding articles to be welded.

An important object of the invention is the production of means for supporting pipe flanges while butt welding them in position upon pipes. Heretofore, this has commonly been effected by placing the pipe to which the flange is to be welded in a V jig supporting the flange in opposition to the end of the pipe and tack welding the flange to the pipe at spaced points as a preliminary to the final complete welding operation. This method involves a considerable loss of time and is relatively expensive in that it is necessary in order to secure a properly welded joint that the flange boss which is actually welded against the pipe end be held in properly spaced relation to such pipe end and it is difficult to maintain this spacing under ordinary circumstances. Quite obviously, the welding tends to draw up as it cools, thus shifting the pipe flange rendering it necessary that some holding means be provided. Often following a welding operation it is found that there is some slight dislocation of the flange, rendering installation of the completed unit difficult.

A specific object of this invention is the provision of a means which will embrace both the flange and the adjacent end of the pipe to maintain the proper spacing between the boss of the flange and the pipe end and to maintain perfect alignment between these parts during the welding operation.

A further object of the invention is to produce a device of this character so constructed that it may be very readily slipped into both the flange and the pipe and is quite as readily clamped into position thereagainst in a manner insuring and maintaining concentricity of the bores.

These and other objects I attain by the construction shown in the accompanying drawings wherein, for the purpose of illustration, I have shown a preferred embodiment of my invention and wherein:

Fig. 1 is a side elevation of a clamp constructed in accordance with my invention;

Fig. 2 is an end elevation thereof shown extended in a pipe; and

Figure 3:
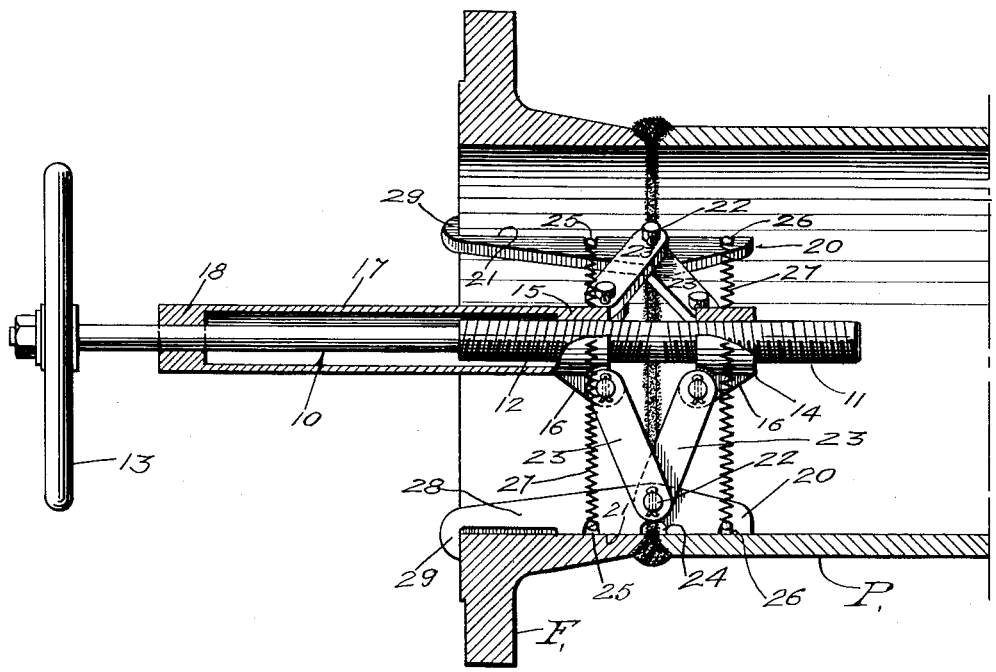
Fig. 3 is a sectional view on line 3—3 of Fig. 2 showing the clamp in position in the pipe.

Referring now more particularly to the drawings, the numeral 10 designates a shaft having at one end oppositely threaded portions 11 and 12, the threaded portion 11 being disposed at one end of the shaft and the section 12 slightly inwardly therefrom. At its opposite end the shaft is provided with a hand wheel 13 or other suitable means whereby it may be rotated. Mounted upon the sections 11 and 12 are nuts 14 and 15 each having a plurality of radiating ears 16. The nut 14 is otherwise in the form of a simple threaded sleeve while the nut 15 has a tubular extension 17 surrounding the shaft and having adjacent the rotating means 13 a bearing 18 receiving and guiding the shaft. This sleeve is preferably externally hexagonal or otherwise roughened through a portion of its length as indicated at 19 so that it may be readily grasped by the hand to prevent turning thereof. The ears 16 of the nuts 14 and 15 are similar in number and arrangement, and associated with each pair of ears is a clamping bar 20 having a clamping face 21 along the outer edge thereof. At the approximate center of the length of the clamping face the bar mounts a pivot 22 and this pivot is connected by links 23 with associated ears 16 of the nuts 14 and 15. Centrally of the clamping face, the face itself is notched at 24 for a purpose presently to appear and at opposite sides of this notch but differently spaced from pivot 22 are notches 25 and 26. The notches 25 and 26 receive tension springs 27 a spring being associated with each series of notches, and the springs being of approximately the same strength, the notches 26 being further spaced from the pivots 22 and being disposed at the inner ends of bars 20, the inner ends of the bars tend to move together until the forces exerted by the springs are balanced and the bars of the assemblage thus normally assume a position more clearly shown in Fig. 1.

Each bar has at its outer end an extension 28 the inner face of which is offset inwardly from the clamping face 21 of the bar and the outer end of which has an outturned extension 29 forming a stop to engage against the flange F which is to be welded to a pipe P.

In use of the apparatus the sleeve 17 is held in the hand and the shaft rotated through means 13 until the bars 20 are disposed on such a radius that they may be entered in the bores of the flange and pipe. The flange is then placed in its approximate position and the assemblage entered until the angular extensions 29 engage the flange F. If the tool has been expanded to the proper extent, the spring engaged in notches 26 will cause the outer ends of the clamping faces 21 to engage against the flange with sufficient force to hold it by friction at this time and if the adjustment has not been proper, it is regulated until a proper friction has been set up between both the pipe and flange and the bars 20 of the tool. The adjustment of the flange with relation to the pipe can then be obtained by tapping the flange with a hammer or other tool until the spacing is exact, after which the tool may be firmly seated and will hold the flange in the desired position during the welding operation. Notches 24, at the time when extensions 29 engage against the flange, will be aligned with the end of the flange and thus come under the weld preventing the welding material from adhering to the tool and rendering removal thereof difficult.

Obviously, the structure as herein illustrated is capable of a considerable range of change and modification without in any manner departing from the spirit of my invention, I accordingly do not wish to be understood as limiting myself thereto except as hereinafter claimed.

I claim:

1. In a clamping apparatus for holding pipe flanges and the like while welding the same to an associated pipe joint, a structure including a plurality of circumferentially spaced centrally pivoted clamping arms, said structure adapted to be bodily inserted into the bores of the flange and pipe, means for simultaneously moving the arms radially, and means yieldably maintaining the arms with the ends thereof which are adapted to be first inserted in the bores of the flange and pipe upon a radius slightly less than the radius upon which the opposite ends thereof are disposed.

2. In a clamping apparatus for holding pipe flanges and the like while welding the same to an associated pipe joint, a structure including a plurality of circumferentially spaced centrally pivoted clamping arms, said structure adapted to be bodily inserted into the bores of the flange and pipe, means for simultaneously moving the arms radially, and means yieldably maintaining the arms with the ends thereof which are adapted to be first inserted in the bores of the flange and pipe upon a radius slightly less than the radius upon which the opposite ends thereof are disposed, the last-named ends of the arms having stops to engage the outer end of the flange and limit the extension of the structure into the bore thereof.

3. In a clamping apparatus for holding pipe flanges and the like while welding the same to an associated pipe joint, a structure including a plurality of circumferentially spaced clamping arms, said structure adapted to be bodily inserted into the bores of the flange and pipe, means for simultaneously moving the arms radially, and means yieldably maintaining the arms with the ends thereof which are adapted to be first inserted in the bores of the flange and pipe upon a radius slightly less than the radius upon which the opposite ends thereof are disposed, the last-named ends of the arms having stops to engage the outer end of the flange and limit the extension of the structure into the bore thereof, the arms in alignment with the inner end of the flange having notches formed in the flange bore-engaging surfaces thereof.

4. In clamping apparatus for clamping flanges or the like to pipes preparatory to a welding operation for uniting the same, a pair of co-axial elements, means for moving the elements toward and away from one another, a plurality of circumferentially spaced arms in surrounding relation to the elements, a pair of links associated with each arm and connected to said elements, and means normally yieldably maintaining those ends of the arms which are to be first inserted in the bores of the flange and pipe upon a radius slightly less than the radius upon which the opposite ends thereof are disposed.

5. In clamping apparatus for clamping flanges or the like to pipes preparatory to a welding operation for uniting the same, a pair of co-axial elements, means for moving the elements toward and away from one another, a plurality of circumferentially spaced arms in surrounding relation to the elements, a pair of links associated with each arm and connected to said elements, said arms at aligned points having notches formed therein at the clamping faces thereof and means upon the outer ends of the arms to engage the flange and limit the projection of the arms into the flange when said notches are aligned with the inner end of the flange.

6. In clamping apparatus for clamping flanges or the like to pipes preparatory to a welding operation for uniting the same, a pair of co-axial elements, means for moving the elements toward and away from one another, a plurality of circumferentially spaced arms in surrounding relation to the elements, a pair of links associated with each arm and connected to said elements, means normally yieldably maintaining those ends of the arms which are to be first inserted in the bores of the flange and pipe upon a radius slightly less than the radius upon which the opposite ends thereof are disposed, said arms at aligned points having notches formed therein at the clamping faces thereof, and means upon the outer ends of the arms to engage the flange and limit the projection of the arms into the flange when said notches are aligned with the inner end of the flange.

7. In a clamping apparatus for holding pipe flanges and the like while welding the same to an associated pipe joint, a structure including a plurality of circumferentially spaced clamping arms, said structure adapted to be bodily inserted into the bores of the flange and pipe, and means for simultaneously moving the arms radially, the last-named ends of the arms having stops to engage the outer end of the flange and limit the extension of the structure into the bore thereof, the arms in alignment with the inner end of the flange having notches formed in the flange bore-engaging surfaces thereof.

CHARLES C. DAVIS.